United States Patent
Barsness et al.

(10) Patent No.: US 9,015,726 B2
(45) Date of Patent: Apr. 21, 2015

(54) SCHEDULING JOBS OF A MULTI-NODE COMPUTER SYSTEM BASED ON ENVIRONMENTAL IMPACT

(75) Inventors: Eric L. Barsness, Pine Island, MN (US); David L. Darrington, Rochester, MN (US); Amanda E. Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1528 days.

(21) Appl. No.: 12/418,044

(22) Filed: Apr. 3, 2009

(65) Prior Publication Data

US 2010/0257531 A1    Oct. 7, 2010

(51) Int. Cl.
*G06F 9/50* (2006.01)
*G06F 9/48* (2006.01)

(52) U.S. Cl.
CPC ............ *G06F 9/4893* (2013.01); *G06F 9/5072* (2013.01); *G06F 9/5094* (2013.01); *Y02B 60/144* (2013.01)

(58) Field of Classification Search
CPC .................................................. G06F 9/4893
USPC ......................................................... 718/102
See application file for complete search history.

(56) References Cited

U.S. PATENT DOCUMENTS

| | | | |
|---|---|---|---|
| 7,596,431 B1* | 9/2009 | Forman et al. | 700/299 |
| 7,644,148 B2* | 1/2010 | Ranganathan et al. | 709/223 |
| 7,756,666 B2* | 7/2010 | Aguilar et al. | 702/130 |
| 7,870,370 B2* | 1/2011 | Fontenot et al. | 712/227 |
| 8,732,307 B1* | 5/2014 | Zhu et al. | 709/226 |
| 2005/0228618 A1* | 10/2005 | Patel et al. | 702/188 |
| 2006/0047808 A1* | 3/2006 | Sharma et al. | 709/224 |
| 2007/0124101 A1* | 5/2007 | Aguilar et al. | 702/130 |
| 2009/0228893 A1* | 9/2009 | Behrendt et al. | 718/105 |
| 2010/0228861 A1* | 9/2010 | Arsovski et al. | 709/226 |

OTHER PUBLICATIONS

Khargharia et al. "Autonomic Power and Performance Management for Computing Systems". Jan. 30, 2006. pp. 145-154.*

* cited by examiner

*Primary Examiner* — Jacob A Petranek
(74) *Attorney, Agent, or Firm* — Patterson & Sheridan, LLP (57) ABSTRACT

Embodiments of the invention provide techniques for scheduling jobs on a multi-node computing system based on the predicted environmental impact of executing the jobs. In one embodiment, a plurality of job plans may be generated for processing a requested job on the multi-node computing system. The environmental impacts resulting from executing each job plan may be estimated by matching the job plans to stored data based on standardized executions of job plans. Further, environmental impacts may be estimated by matching the job plans to stored data based on actual environmental measurements obtained during prior executions of the job plan on the multi-node computer system. The job may be executed using a job plan selected based on predicted environmental impacts and time performance.

26 Claims, 4 Drawing Sheets

SCHEDULING JOBS OF A MULTI-NODE COMPUTER SYSTEM BASED ON ENVIRONMENTAL IMPACT

BACKGROUND OF THE INVENTION

1. Field of the Invention

Embodiments of the invention relate to scheduling of jobs on multi-node computing systems. More specifically, embodiments of the invention are directed to scheduling of jobs on multi-node computing systems based on a predicted environmental impact of executing the jobs.

2. Description of the Related Art

Powerful computers may be designed as highly parallel multi-node computing systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel multi-node computing systems has been (and continues to be) developed by International Business Machines (IBM) under the name Blue Gene®. The Blue Gene/L architecture provides a scalable, parallel computer that may be configured with a maximum of 65,536 ($2^{16}$) computing nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites world-wide were among five out of the ten top most powerful computers in the world.

The computing nodes in a multi-node computing system typically communicate with one another over multiple communication networks. For example, the computing nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of computing nodes. Of course, other message passing interfaces have been (and are being) developed. Additionally, the Blue Gene/L includes both a collective network and a global interrupt network. Further, certain nodes are also connected to a gigabit Ethernet. These nodes are typically used to perform I/O operations between the Blue Gene core and an external entity such as a file server. Other multi-node computing architectures also use multiple, independent networks to connect computing nodes to one another.

Large scale multi-node computing systems such as the Blue Gene architecture were originally designed to support a SIMD (Single Instruction Multiple Data) programming paradigm. This typically involves running one large scale tightly coupled MPI-based application across all of the computing nodes in a partition. In comparison to other available packaging strategies, this packaging produces many teraflops per rack, has a large memory footprint and low power consumption. This also makes the Blue Gene architecture attractive for a High Throughput Computing (HTC) model. HTC provides a computing model that allows for independent work units on each compute node.

SUMMARY OF THE INVENTION

Embodiments of the invention provide techniques for presenting energy consumption information in a program development tool. One embodiment of the invention includes computer-implemented method. The method may generally include receiving a request to process a job on a multi-node computer system, generating a plurality of job plans for processing the requested job on the multi-node computer system, and estimating a predicted environmental impact for executing each job plan. The method may further include selecting, based at least in part on the estimated environmental impact predictions, one of the plurality of job plans and executing the job according to the selected job plan.

Another embodiment of the invention includes a computer readable storage medium containing a program which, when executed, performs an operation. The operation may generally include receiving a request to process a job on a multi-node computer system, generating a plurality of job plans for processing the requested job on the multi-node computer system, and estimating a predicted environmental impact for executing each job plan. The operation may further include selecting, based at least in part on the estimated environmental impact predictions, one of the plurality of job plans and executing the job according to the selected job plan.

Still another embodiment of the invention includes a multi-node computing system. The system may include a plurality of computing nodes, each having a processor and a memory. The plurality of computing nodes may each be available to perform a computing job. The system may also include a master node having a processor and a memory. The master node may execute a job-scheduling application. The job-scheduling application may be configured to perform an operation. The operation may generally include receiving a request to process the job on a multi-node computer system, generating a plurality of job plans for processing the requested job on the multi-node computer system, and estimating a predicted environmental impact for executing each job plan. The operation may further include selecting, based at least in part on the estimated environmental impact predictions, one of the plurality of job plans and executing the job according to the selected job plan.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In typical multi-node computing systems, jobs are scheduled and executed as nodes become available. The scheduling of a job may take into account a job priority and/or a user priority. As a job executes on a multi-node system, environmental conditions at each node may be affected. In this regard, "environmental conditions" refer to the conditions of the natural/physical environment, as opposed to the programmatic state of the respective nodes. For example, as electrical power is consumed by components of the node (e.g., processors, storage drives, power supplies, etc.), heat energy may be generated within the node. If enough heat energy is generated, temperatures within the node may increase to a level that may affect or damage the components. Further, such elevated temperatures may impact environmental controls (e.g., fans, air conditioning, coolant pumps, etc.).

Embodiments of the invention provide techniques for scheduling a job on a multi-node computing system based on the predicted environmental impact of executing that job. In one embodiment, a plurality of job plans may be generated for processing a requested job on the multi-node computing system. The environmental impacts resulting from executing each job plan may be estimated by matching the job plans to stored data based on standardized executions of job plans on typical multi-node computer systems. Further, environmental impacts may be estimated by matching the job plans to stored data based on actual environmental measurements obtained during prior executions of the job plan on the multi-node computer system. The job may be executed using a job plan selected based on predicted environmental impacts and time performance. As used herein, the term "environmental impacts" generally refers to effects on environmental conditions that result from executing a job, including changes to temperature, heat load, airflow, humidity, etc. Further, "environmental impacts" may also refer to effects on control devices, including increased electrical power load from air fans, increased loads on air conditioners or cooling systems, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
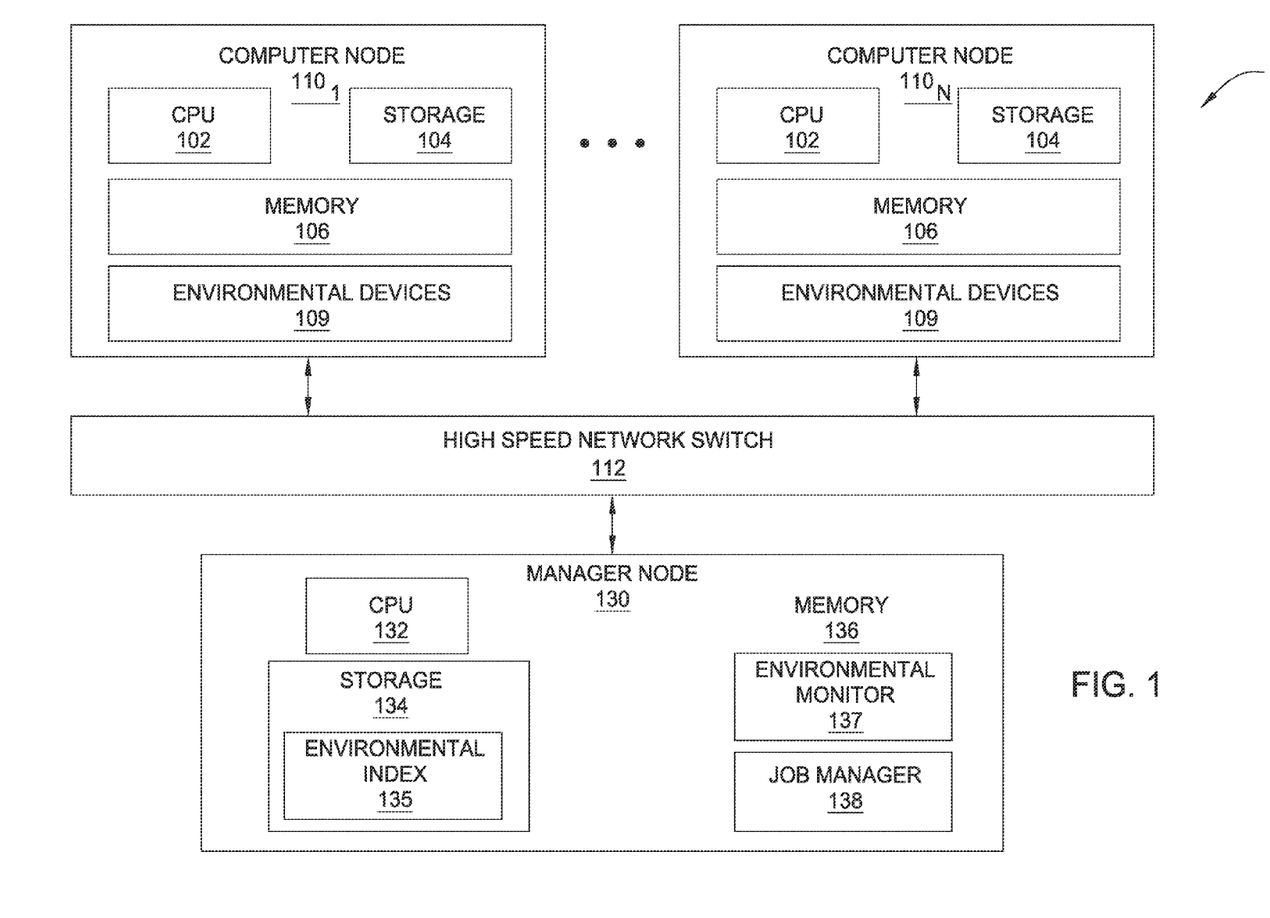
FIG. 1 is a block diagram illustrating components of a multi-node computing system, according to one embodiment of the invention.

FIG. 1 is a block diagram illustrating components of a multi-node computing system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

Of course, the computing system 100 is shown for illustrative purposes, and is not intended to limit the present invention. Embodiments of the invention may be adapted use with a variety of distributed computer systems, including grid computing, computing clusters, adaptive architecture supercomputing, and the like. Further, embodiments of the invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, computing system 100 includes computing nodes $110_1$-$110_N$ and a manager node 130, connected via a high-speed network switch 112. In one embodiment, the manager node 130 may be configured to direct the operation of the computing nodes $110_1$-$110_N$. For example, a manger node 130 may be configured to partition nodes on a large computing core (e.g., a the torus of nodes on a Blue Gene system) send jobs to a partition of nodes. Of course, those skilled in the art will recognize that FIG. 1 provides a simplified representation of a multi-node computing system, and that the computing system 100 may include a large number of additional computing nodes.

Figure 2:
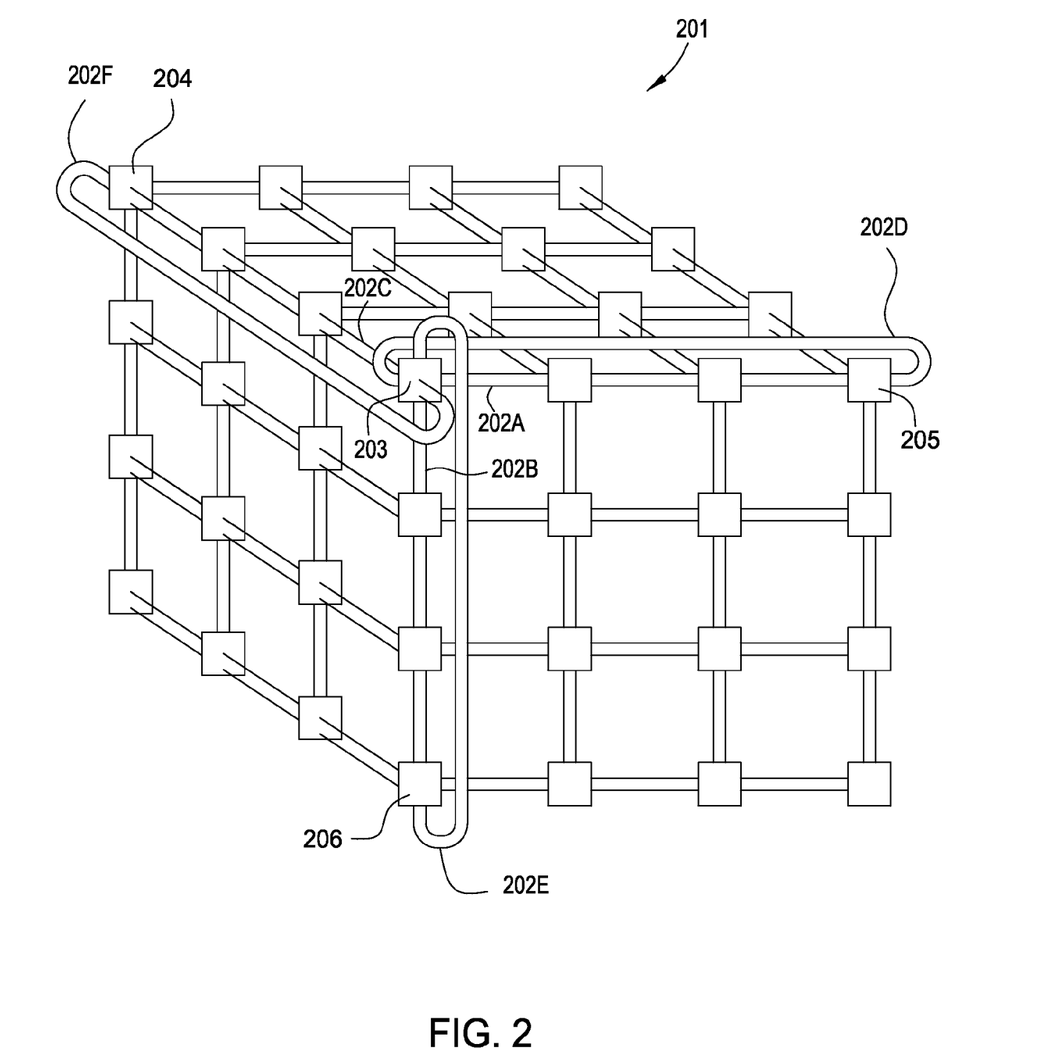
FIG. 2 is an illustration of a three-dimensional torus network of a multi-node computing system, according to one embodiment of the invention.

In one embodiment, the computing nodes $110_1$-$110_N$ may be logically arranged in a three (or more) dimensional torus, where each computing node 110 may be identified using an x, y and z coordinate. FIG. 2 is a illustration of a three-dimensional torus network of system 100, according to one embodiment of the invention. More specifically, FIG. 2 illustrates a 4×4×4 torus 201 of computing nodes 110, in which the interior nodes are omitted for clarity. Although FIG. 2 shows a 4×4×4 torus having 64 nodes, it will be understood that the actual number of computing nodes in a parallel computing system is typically much larger. For example, a Blue Gene/L system may be configured with 65,536 computing nodes 110. Illustratively, each computing node 110 in torus 201 includes a set of six node-to-node communication links 202A-F which allows each computing node 110 in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The computing nodes 110 may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the computing nodes in any one of the x, y, or z dimensions form a torus in that dimension because the point-to-point communication links logically wrap around. For example, this is represented in FIG. 2 by links 202D, 202E, and 202F which wrap around from node 203 to other end of torus 201 in each of the x, y and z dimensions. Thus, although node 203 appears to be at a "corner" of the torus, node-to-node links 202A-F link node 203 to nodes 204, 205, and 206, in the x, y, and z dimensions of torus 201.

Referring again to FIG. 1, each computing node 110 may include a CPU 102, storage 104 memory 106, and environmental devices 109, typically connected by a bus (not shown). CPU 102 is a programmable logic device that performs all the instruction, logic, and mathematical processing in a computer. Storage 104 includes hard-disk drives, flash memory devices, optical media and the like. Memory 106 may be one or a combination of memory devices, including Random Access Memory, nonvolatile or backup memory, (e.g., programmable or Flash memories, read-only memories, etc.). Environmental devices 109 may be one or more devices configured to control environmental conditions of the computing node 110. For example, environmental devices 109 may include cooling devices such as adjustable air fans, coolant pumps, variable power supplies, and the like. Further, environmental devices 109 may include measuring devices to monitor the environmental state of the computing node, such as temperature (e.g., thermometers, thermocouples), air flow, coolant flow, electrical power consumption, etc.

As shown, the manager node 130 may include a CPU 132, storage 134 and memory 136, typically connected by a bus (not shown). CPU 132 may be a programmable logic device that performs all the instruction, logic, and mathematical processing in a computer. Storage 134 includes hard-disk drives, flash memory devices, optical media and the like. The storage 134 includes environmental index 135, representing a stored data structure describing environmental impacts associated to predefined job plans. The environmental index 135 is described further below.

Memory 136 may be one or a combination of memory devices, including Random Access Memory, nonvolatile or backup memory, (e.g., programmable or Flash memories, read-only memories, etc.). Illustratively, memory 136 includes an environmental monitor 137, representing a software application configured to monitor environmental conditions at the computing nodes $110_1$-$110_N$. For example, the environmental monitor 137 may receive temperature data or power consumption data from environmental devices 109 located in computing node $110_1$. Memory 136 may also include a job manager 138, representing a software application configured to generate job plans. Each job plan may specify one or more tasks to be performed by the computing nodes $110_1$-$110_N$ in order to process a job request received by the computing system 100.

In one embodiment, the job manager 138 may be configured to schedule jobs based on their predicted environmental impacts. For example, the job manager 138 may receive a job request, and in response may generate and/or identify multiple candidate job plans which may be used to perform the requested job on computing system 100. The candidate job plans may differ in the nodes that are assigned to perform the tasks required to complete a requested job, the order in which the tasks are to be performed, whether tasks are to be performed serially or in parallel, the scheduled start/finish times for each task, the level of tasks assigned, the number of other jobs expected to also be running on the computing core, and the like. The job manager 138 may predict an expected environmental impact associated with executing each candidate job plan. For example, assume a job plan that specifies a set of tasks to be executed on computing nodes $110_1$-$110_4$. In such a case, the job manager 138 may estimate the thermal energy (i.e., heat) produced by components (e.g., CPU 102, storage 104, etc.) of the computing nodes $110_1$-$110_4$ in executing their respective tasks assigned by a variety of different job plans.

In one embodiment, the job manager 138 may determine the predicted environmental impact of a job plan by matching the job plan to one or more records included in the environmental index 135. Each record in the environmental index 135 may include a unique identifier for a particular job plan. Optionally, each record may also include one or more system settings associated with executing a job plan on the computing nodes 110 (e.g., minimum temperature, maximum temperature, voltages, fans speeds, job timing, etc.). Further, each record may also include an identifier for an input data set used in executing the job plan (e.g., a named data set, an output of a predefined query, a table, a column, and the like). Furthermore, each record may include data describing an environmental impact associated with executing the described job plan. For example, each record may describe the thermal energy (i.e., heat) generated by each computing node 110 in executing tasks specified in the job plan.

In one embodiment, the job manager 138 may match a job plan to the records of the environmental index 135 by matching the identifier of the current job plan. Optionally, the job manager 138 may additionally match any system settings associated with the job plan, and/or a unique identifier for an input data set associated with the job plan. Upon matching the job plan to a record, the job manager 138 may retrieve data describing the environmental impact associated with executing the job plan. By matching such system settings and/or input data sets, in addition to matching a job plan identifier, the job manager 138 may more accurately predict the environmental impact of a given job plan.

In one embodiment, the environmental index 135 may be predefined data based on standardized executions of job plans on similar (or identical) multi-node computer systems. Optionally, the environmental index 135 may be generated and/or updated based on actual environmental measurements obtained during execution of various jobs (using a corresponding job plan) on a specific multi-node computer system (e.g., the computer system 100 illustrated in FIG. 1). For example, the environmental devices 109 may include a sensor configured to measure heat energy produced by a computing node 110 at various points in time, and to communicate such information to the manager node 130 (via the high-speed network switch 112). Such measurements may be measured for the computing node 110 as a whole, or may be measured for individual components such as CPU 102, storage 104, memory 106, cooling devices, network devices, and the like. The environmental monitor 137 (included in manager node 130) may be configured to generate and/or update the environmental index 135 on the basis of environmental information received from each computing node 110 during execution of a given job plan. Thus, the environmental index may be updated with the results of executing a particular job using a particular job plan, as well as general information regarding the environmental impact of that job. One embodiment of a method for generating the environmental index 135 based on actual environmental measurements is described below with reference to FIG. 4.

In one embodiment, the job manager 138 may select the candidate job plan based on predicted environmental impact. That is, the job manager 138 may select a job plan based on a preferred environmental impact, such as heat energy generated (i.e., heat load), electrical power consumption, cooling system demand, and the like. For example, a job plan may be selected so that certain tasks (e.g., a task specified to be executed with a minimized environmental impact) are executed during nighttime, since electrical and/or cooling costs for the computing system 100 may be lower than during peak times during the day. As another example, the selected job plan may schedule tasks at a smaller number of computing nodes 110 which may be more energy efficient, so as to complete the job with minimum electrical power consumption. In yet another example, the selected job plan may distribute tasks over a large number of computing nodes 110, such that the heat load due to processing at any given node is minimized. In yet another example, the selected job plan may distribute tasks evenly over all available computing nodes 110, such that the computing workload is evenly balanced throughout the entire computer system 100. In yet another example, the selected job plan may delay the execution of certain tasks to the next day, such that a maximum daily electrical power allocation for the computer system 100 is not exceeded.

In another embodiment, the job manager 138 may select the candidate job plan that most closely matches a specified preference for a balance between the time performance and environmental impact for job plans (e.g., a preference for a particular job, default settings for all jobs, or a combination of both). Such a preference may be specified by a user (e.g., an administrator of the computing system 100). For example, in the situation that an administrator has specified a preference to maximize time performance in executing jobs, the job manager 138 may select a job plan that is predicted to execute in a minimum time. On the other hand, if the administrator has specified a preference to minimize environmental impact in executing jobs, the job manager 138 may select a job plan that may not execute the fastest, but that has a minimal environmental impact during execution—as predicted by the job plans and the environmental index.

Further, the administrator may specify a preference for a given balance between the performance and environmental impact characteristics of selected job plans. For example, the administrator may specify a percentage for each factor (e.g., 40% performance, 60% environmental impact), indicating a relative importance to be allocated to each factor. The job manager 138 may be configured to calculate a time performance score and an environmental impact score for each job plan, and then to multiply each score by the respective percentage, thus reflecting the relative importance specified by the administrator. In order to perform such balancing, the time performance and environmental impact scores may be normalized. That is, the two scores may be converted to a unit-less numbers, so as to allow comparison between the two aspects. For example, the job manager 138 may be configured to normalize the time performance estimates by dividing them by a time baseline, thus resulting in a unit-less ratio of estimated time performance to a baseline performance.

In another embodiment, the job manager 138 may be configured to determine a cost for each candidate job plan. Further, the job manager 138 may be configured to select a job plan based on the cost determined for each candidate job plan. For example, the job manager 138 may determine a monetary cost for each candidate job plan based on a predicted amount of electrical power required to execute the candidate job plan. The job manager 138 may then select the candidate job plan having the lowest determined monetary cost. In another example, the job manager 138 may determine a "carbon footprint" for each job plan, meaning the amount of carbon estimated to be produced during generation of the electrical power consumed by executing the job plan. The carbon footprint may then be converted to a cost based on predefined carbon credits, a cap-and-trade costing scheme, and the like.

Of course, the above examples are provided for purposes of illustration, and are not intended to be limiting of the invention. Other embodiments are contemplated, and are thus considered to be in the scope of the invention. For example, it is contemplated that the job manager 138 may be matched to records of the environmental index 135 by matching one or more tasks included in the job plan, rather than by matching the job plan as a whole. Thus, the environmental index 135 may also describe environmental impacts of tasks.

Figure 3:
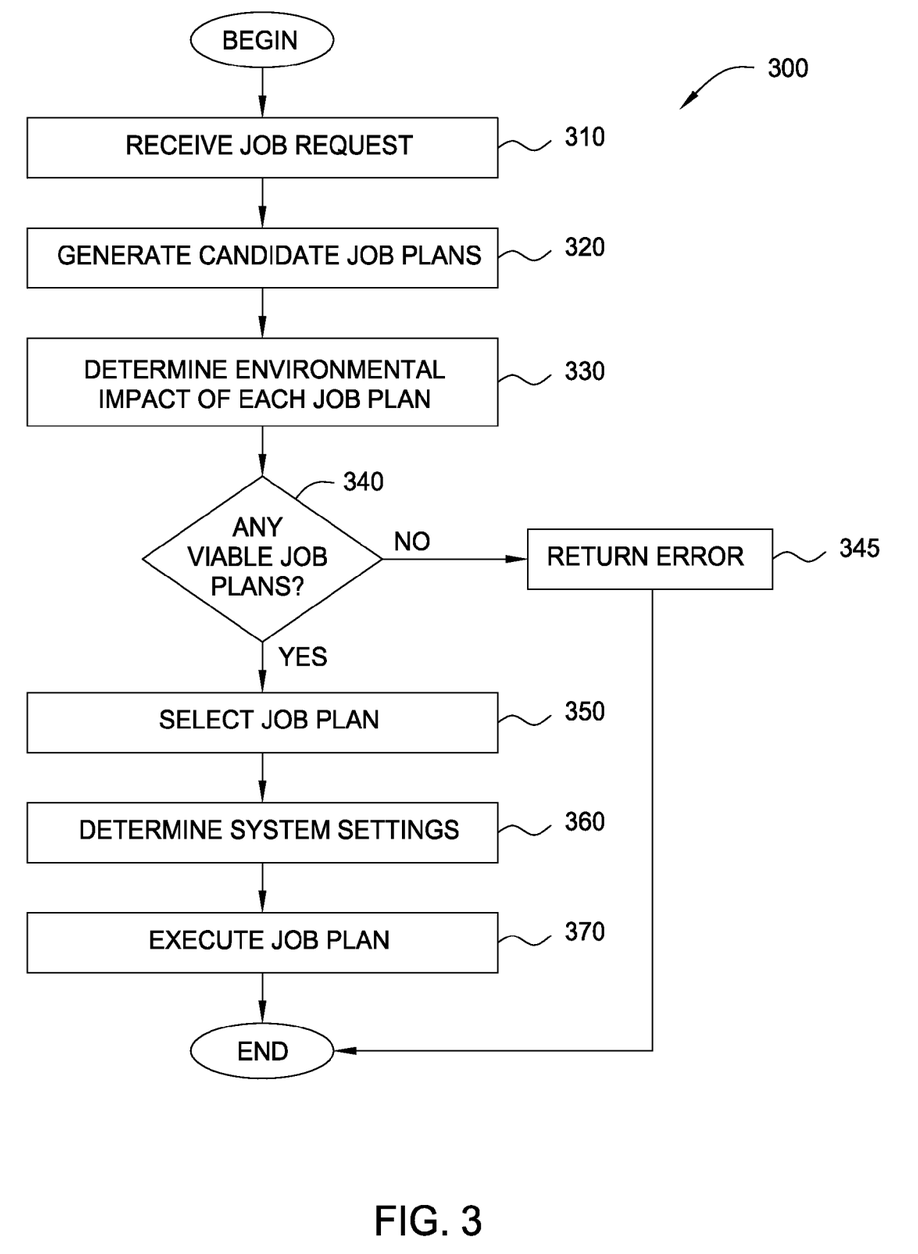
FIG. 3 is a flow diagram illustrating a method for scheduling a job on a multi-node system based on environmental factors, according to one embodiment of the invention.

FIG. 3 is a flow diagram illustrating a method 300 for scheduling a job on a multi-node system based on environmental factors, according to one embodiment of the invention. Persons skilled in the art will understand that, even though the method is described in conjunction with the system of FIG. 1, any system configured to perform the steps of method 300, in any order, is within the scope of the present invention.

The method 300 begins at step 310, where a request to execute a job on a multi-node computer system is received. For example, the job manager 138 may receive a request to execute a job on the computing system 100 (illustrated in FIG. 1). As an example, such a job request may relate to financial modeling, astronomy, climate modeling, chemistry, biochemistry, plate tectonics, and the like. At step 320, one or more candidate job plans to fulfill the job request may be generated. For example, the job manager 138 may generate multiple job plans for the computing nodes $110_1$-$110_N$. Each job plan may differ in the tasks assigned to each node, the order in which the tasks are to be performed, the number of nodes partitioned to perform the job, the particular nodes assigned to perform the job (on a system where the nodes are not homogenous), and the like.

At step 330, the environmental impact of each candidate job plan may be determined. For example, the job manager 138 may match each candidate job plan to entries of the environmental index 135, and may thus retrieve stored data describing the predicted environmental impacts (e.g., an amount of heat energy generated, an amount of electrical energy consumed, a load on an air conditioning system, etc.) of executing each job plan. Such stored data may be based on standardized executions of job plans on typical multi-node computer systems. Optionally, such stored data may be generated and/or updated based on actual environmental measurements obtained during a previous execution of the job plan on the computer system 100.

At step 340, it may be determined whether any of the candidate job plans are viable, meaning a job plan that can be executed without violating environmental constraints of the computing system. For example, the job manager 138 may analyze the predicted heat energy generated by each job plan to determine whether such heat energy would cause the temperature at a computing node 110 to exceed a predefined temperature limit. In another example, the job manager 138 may analyze the predicted electrical energy required to execute each job plan, and may determine whether such requirements may exceed an rated load on an electrical circuit powering the computer system 100 (or for a particular computing node 110). If there are no viable job plans, then at step 345, an error may be returned. For example, the job manager 138 may return an error to a system administrator and/or the entity that requested the job (at step 310).

However, if it is determined at step 340 that there is one or more acceptable job plans, then at step 350, a job plan may be selected. For example, the job manager 138 may select one of the candidate job plans to be executed by the computing system 100. In one embodiment, the job manager may select the job plan having the smallest predicted environmental impact (determined at step 330). In another embodiment, the job manager 138 may select the job plan that most closely matches a specified preference for a balance between the time performance and environmental impact of job plans executing on the computing system 100.

At step 360, system settings for executing the job plan may be determined. For example, the job manager 138 may determine system settings for the computing nodes 110 that may have an environmental impact of executing a job plan. For example, such system settings may include air flow (e.g., fan speed), coolant flow, reserved power supply, target temperature, and the like.

At step 370, the job plan may be executed. For example, the computing nodes $110_1$-$110_N$ may execute the job plan selected by the job manager 138 (at step 350). The job plan may be executed according to the system settings determined by the job manager 138 (at step 360). In one embodiment, the environmental monitor 137 may monitor environmental conditions during execution of the job plan. Such information may be used to update the environmental index. Further, such information may be used to determine if an environmental condition is out of a desired range. If so, the job manager 138 may adjust environmental devices 109 to attempt to bring the environmental condition back into the desired range. For example, if the environmental monitor 137 detects a computing node 110 having a temperature above a maximum level, the environmental monitor 137 may activate a cooling fan to cool that computing node 110. After step 370, the method 300 terminates.

Figure 4:
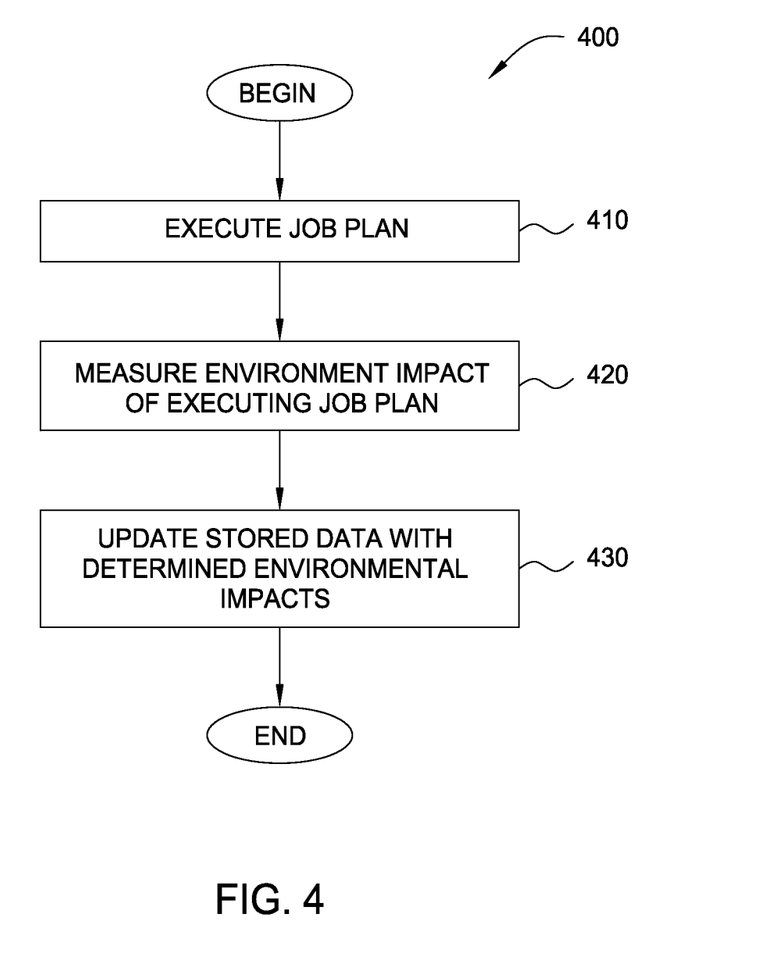
FIG. 4 illustrates a method for generating environmental impact data based on environmental measurements obtained while executing a computing job, according to one embodiment of the invention.

FIG. 4 illustrates a method 400 for generating environmental impact data based on environmental measurements obtained while executing a computing job, according to one embodiment of the invention. Persons skilled in the art will understand that, even though the method is described in conjunction with the system of FIG. 1, any system configured to perform the steps of method 400, in any order, is within the scope of the present invention.

As shown, method 400 begins at step 410, where a job plan is executed. For example, as described above with reference to FIG. 3, computing nodes $110_1$-$110_N$ of computer system 100 may execute a job plan selected by a job manager 138.

At step 420, one or more environmental impacts resulting from executing the job plan may be measured. For example, referring to FIG. 1, the environmental monitor 137 may receive measurement data (via high-speed network switch 112) provided by environmental devices 109 (e.g., thermometers) located at the computing nodes 110. Based on the received measurement data, the environmental monitor 137 may determine one or more environmental impacts (e.g., temperature, power consumption, etc.) at each node involved in the execution of the job plan. Such measurements may be performed at all nodes in the computer system 100, at a defined sample of nodes (e.g., a statistical or random sample), or at rotating sets of nodes. Further, such measurements may be performed continually or at specified time intervals. In one embodiment, program code executing on a node may be instrumented to trigger a sampling event to measure current environmental conditions at the node.

At step 430, the determined environmental impacts may be included in a stored data structure. For example, the environmental monitor 137 may update records (or add records) in the environmental index 135. Each record may be updated to include one or more unique identifiers for the job plan. Optionally, each record may be updated to also include other data that may be used to match the record to a later job plan (e.g., unique identifiers for tasks included in the job plan, system settings used during execution of the job plan, a unique identifier for an data set used as input for executing the job plan, etc.). Additionally, each record in the environmental index 135 may be updated to include a description of the measured environmental impacts (e.g., temperature, electrical power consumed, heat load, air conditioning load, etc.).

After step 430, the method 400 terminates. Once the environmental index 135 is updated using the method 400, it may be accessed by the job manager 138 in order to determine the predicted environmental impact of subsequently executing another instance of the same (or a similar) job plan, as described above with reference to step 330 of method 300.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a request to execute a distributed computing task on a plurality of independent computing nodes of a multi-node computer system, each node having at least a processor and a memory;
generating a plurality of job plans for processing the requested distributed computing task on the multi-node computer system, wherein each job plan specifies a set of one or more of the computing nodes to use to execute the distributed computing task;
estimating a predicted environmental impact for executing each job plan based on an environmental index providing data describing environmental impacts associated with executing each of the job plans, wherein the predicted environmental impact estimates a predicted amount of thermal energy generated from executing each of the job plans;
selecting, based at least in part on the estimated environmental impact predictions, one of the plurality of job plans;
executing the distributed computing task according to the selected job plan;
during the execution of the distributed computing task, monitoring the independent computing nodes to determine an actual environmental impact from executing the selected job plan; and
updating the environmental index with the actual environmental impact associated with executing the selected job plan.

2. The computer-implemented method of claim 1, wherein the predicted environmental impact for each job plan is based on standardized executions of job plans on the specified sets of one or more computing nodes of the multi-node computer system.

3. The computer-implemented method of claim 1, wherein the predicted environmental impact for each job plan is based on measurements obtained during prior executions of the job plan on the specified sets of one or more computing nodes of the multi-node computer system.

4. The computer-implemented method of claim 1, wherein the predicted environmental impacts further comprises (i) a predicted amount of electrical power consumed from executing the job plan and (ii) a predicted amount of air conditioning load generated while executing the job plan.

5. The computer-implemented method of claim 1, wherein estimating the predicted environmental impact for each job plan comprises, for each of the plurality of job plans, matching an identifier associated with a respective job plan to stored data describing estimated environmental impacts of one or more predefined job plans.

6. The computer-implemented method of claim 5, wherein estimating the predicted environmental impact for each job plan further comprises, for each of the plurality of job plans, matching one or more system settings associated with the job plan to stored data describing estimated environmental impacts of one or more predefined job plans.

7. The computer-implemented method of claim 5, wherein estimating the predicted environmental impact for each job plan further comprises, matching an identifier of an input data set associated with the job plan to stored data describing estimated environmental impacts of one or more predefined job plans.

8. The computer-implemented method of claim 1, wherein selecting one of the plurality of job plans is further based on time performance associated with executing each job plan.

9. The computer-implemented method of claim 1, wherein selecting one of the plurality of job plans is further based on a user-specified preference for a relative priority between environmental impact and time performance.

10. The computer-implemented method of claim 1, further comprising:
monitoring the distributed computing plan executed according on the computing nodes specified by the selected job plan for an actual environmental impact experienced while executing the job; and
recording an indication of the actual environmental impact.

11. A non-transitory computer-readable storage medium containing a program which, when executed, performs an operation, comprising:
receiving a request to execute a distributed computing task on a plurality of independent computing nodes of a multi-node computer system, each node having at least a processor and a memory;
generating a plurality of job plans for processing the requested distributed computing task on the multi-node computer system, wherein each job plan specifies a set of one or more of the computing nodes to use to execute the distributed computing task;
estimating a predicted environmental impact for executing each job plan based on an environmental index providing data describing environmental impacts associated with executing each of the job plans, wherein the predicted environmental impact estimates a predicted amount of thermal energy generated from executing each of the job plans;
selecting, based at least in part on the estimated environmental impact predictions, one of the plurality of job plans;
executing the distributed computing task according to the selected job plan;
during the execution of the distributed computing task, monitoring the independent computing nodes to determine an actual environmental impact from executing the selected job plan; and
updating the environmental index with the actual environmental impact associated with executing the selected job plan.

12. The non-transitory computer-readable storage medium of claim 11, wherein the predicted environmental impact for each job plan is based on standardized executions of job plans on the specified sets of one or more computing nodes of the multi-node computer system.

13. The non-transitory computer-readable storage medium of claim 11, wherein the predicted environmental impact for each job plan is based on measurements obtained during prior executions of the job plan on the specified sets of one or more computing nodes of the multi-node computer system.

14. The non-transitory computer-readable storage medium of claim 11, wherein the predicted environmental impacts further comprises: (i) a predicted amount of electrical power consumed from executing the job plan and (ii) a predicted amount of air conditioning load generated while executing the job plan.

15. The non-transitory computer-readable storage medium of claim 11, wherein estimating the predicted environmental impact for each job plan comprises, for each of the plurality of job plans, matching an identifier associated with a respective job plan to stored data describing estimated environmental impacts of one or more predefined job plans.

16. The non-transitory computer-readable storage medium of claim 15, wherein estimating the predicted environmental impact for each job plan further comprises, for each of the plurality of job plans, matching one or more system settings associated with the job plan to stored data describing estimated environmental impacts of one or more predefined job plans.

17. The non-transitory computer-readable storage medium of claim 15, wherein estimating the predicted environmental impact for each job plan further comprises, matching an identifier of an input data set associated with the job plan to stored data describing estimated environmental impacts of one or more predefined job plans.

18. The non-transitory computer-readable storage medium of claim 11, wherein selecting one of the plurality of job plans is further based on time performance associated with executing each job plan.

19. The non-transitory computer-readable storage medium of claim 11, wherein selecting one of the plurality of job plans is further based on a user-specified preference for a relative priority between environmental impact and time performance.

20. The non-transitory computer-readable storage medium of claim 11, wherein the operation further comprises:
    monitoring the distributed computing plan executed according on the computing nodes specified by the selected job plan for an actual environmental impact experienced while executing the job; and
    recording an indication of the actual environmental impact.

21. A multi-node computing system, comprising:
    a plurality of computing nodes, each having a processor and a memory, wherein the plurality of computing nodes are available to perform a distributed computing task,
    a master node having a processor and a memory, wherein the master node executes a job-scheduling application, wherein the job-scheduling application is configured to perform an operation, the operation comprising:
        receiving a request to process the distributed computing task on one or more of the plurality of computing nodes,
        generating a plurality of job plans for processing the requested distributed computing task on the one or more nodes of the plurality of computing nodes,
        estimating a predicted environmental impact for executing each job plan based on an environmental index providing data describing environmental impacts associated with executing each of the job plans, wherein the predicted environmental impact estimates a predicted amount of thermal energy generated from executing each of the job plans,
        selecting, based at least in part on the estimated environmental impact predictions, one of the plurality of job plans,
        executing the distributed computing task according to the selected job plan,
        during the execution of the distributed computing task, monitoring the independent computing nodes to determine an actual environmental impact from executing the selected job plan, and
        updating the environmental index with the actual environmental impact associated with executing the selected job plan.

22. The system of claim 21, wherein the predicted environmental impact for each job plan is based on standardized executions of job plans the specified sets of one or more computing nodes of multi-node computer system.

23. The system of claim 21, wherein the predicted environmental impact for each job plan is based on measurements obtained during prior executions of the job plan the specified sets of one or more computing nodes of multi-node computer system.

24. The system of claim 21, wherein the predicted environmental impacts further comprises: (i) a predicted amount of electrical power consumed from executing the job plan and (ii) a predicted amount of air conditioning load generated while executing the job plan.

25. The system of claim 21, wherein estimating the predicted environmental impact for each job plan comprises, for each of the plurality of job plans, matching an identifier associated with a respective job plan to stored data describing estimated environmental impacts of one or more predefined job plans.

26. The system of claim 21, wherein the operation performed by the master node further comprises:
    monitoring the distributed computing plan executed according on the computing nodes specified by the selected job plan for an actual environmental impact experienced while executing the job; and
    recording an indication of the actual environmental impact.

* * * * *